July 10, 1934.　　　McKINLEY STOCKTON　　　1,966,363
METHOD OF CALCINING DIATOMACEOUS EARTH
Filed March 29, 1934
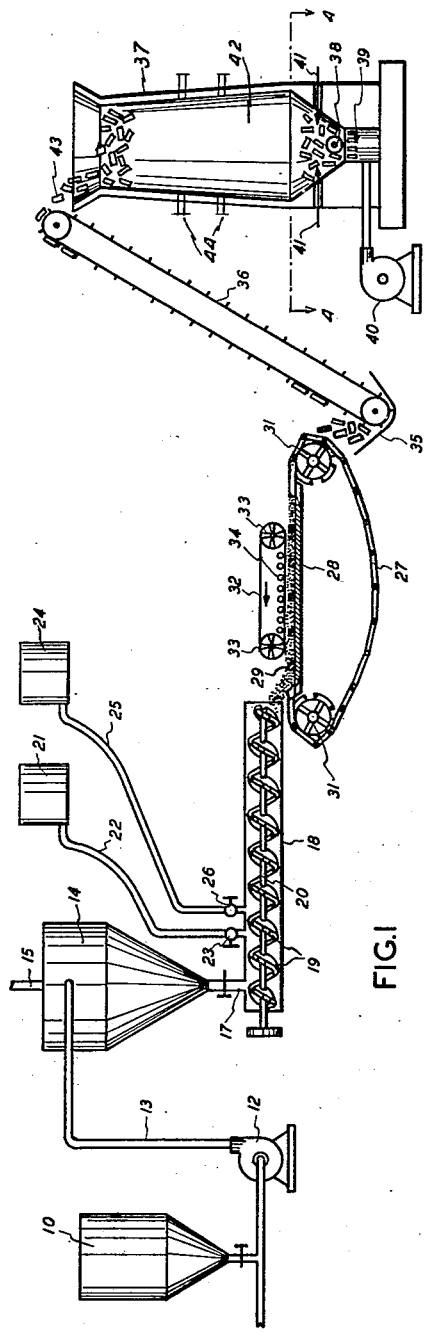
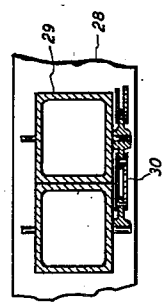
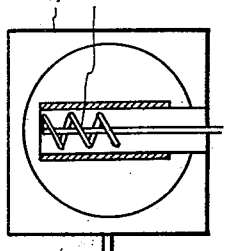
McKINLEY STOCKTON
INVENTOR
ATTORNEY Patented July 10, 1934

1,966,363

UNITED STATES PATENT OFFICE 1,966,363

METHOD OF CALCINING DIATOMACEOUS EARTH

McKinley Stockton, Redondo Beach, Calif., assignor to The Dicalite Company, Los Angeles, Calif., a corporation of Delaware Application March 29, 1934, Serial No. 718,098

4 Claims. (Cl. 252—2)

The herein described invention pertains to the art of calcining diatomaceous or infusorial earth for the purpose of increasing its strength and its lightness and for improving its color, when used as a filter aid, a filler or an insulating material, and for increasing its flow rate when used as a filter aid.

The object of the invention is to provide a method of calcining earths of this character in the form of aggregations having a more or less definite form and size, that is, of small blocks, rods, slabs or other shapes producible by the application of a moderate degree of pressure to a previously powdered and slightly moistened earth.

It is known in the art to calcine diatomaceous earth in formed bodies. The German patent to North, 297,884, describes the pulverization of the crude earth, which is then dampened with a solution of sodium silicate, pressed into what he terms "formstucke", and roasted in a manner not described. The product is a pure white powder.

I have improved over this method in several important respects, and most particularly in the incorporation with the earth of a carefully regulated quantity of fuel, which may be a part or all of the fuel required for the calcination, and in the manner in which the calcination is conducted.

The preparation of the blocks and the operation of calcining may best be described with reference to the attached drawing, in which Fig. 1 illustrates in a highly diagrammatic manner a suitable assemblage of apparatus for putting the method of the invention into practice;

Fig. 2 illustrates in the same manner a modification of that portion of the apparatus in which the calcination is conducted;

Fig. 3 is a plan view of a small part of the apparatus shown in Fig. 1, and

Fig. 4 is a cross section and plan of the shaft furnace 37 as on the line 4—4 of Fig. 1.

Referring first to Fig. 1, the earth may be stored in a bin 10 from which it is introduced in a measured stream into the suction pipe 11 of an air blower 12 in which it is comminuted to a desired degree of fineness. The air stream containing the powdered earth in suspension is then discharged through conduit 12 into a cyclone or other separator 14 from which the air is discharged through a vent 15 while the separated earth collects in the bottom of the vessel. These operations are wholly conventional and the apparatus described is illustrative only.

From the separator a measured stream of the earth passes through conduit 17 into any mixing means 18. The means shown is an elongated pug mill containing blades 19 mounted on a revolving shaft 20.

A carefully proportioned stream of water or other liquid, as for example a solution of a chemical reagent or flux, is added to the earth close to the intake end of the mixing means, as from a tank 21 through pipe 22 and a valve 23, and at the same or a closely adjacent point a stream of the fuel to be used, as for example a heavy petroleum distillate, is added to the earth, as from a tank 24 through pipe 25 and a valve 26.

The quantity of water or other liquid added (and which includes such water as is already present in the earth) is varied according to the nature of the fuel, that is, as to whether it is a solid or a liquid. In some cases where a liquid fuel is used no water may be required. In any case the total quantity of liquid (water or oil or both) is such as to render the earth moist but not wet; so that the application of pressure will produce a shape which will pass into the kiln without too much breakage, and should be as little as is consistent with this requirement and with the addition of a sufficient quantity of fuel.

The proportion of fuel added will depend on whether the blocks are to be burned in the manner illustrated in Fig. 1, in which the total amount of fuel required for calcination is put into the mixture, or in the manner illustrated in Fig. 2, in which case the amount of fuel admixed with the earth may be from one-third to two-thirds of the total fuel requirement.

The dampened earth is discharged from the mixer into a slab forming machine generally indicated at 27. This machine has a stationary bed plate 28 over which rides an endless belt consisting of frames 29 attached to chains 30 and impelled by sprockets 31—31. This arrangement is that of the ordinary pan conveyor with the bottoms of the pans removed and the side frames riding on the fixed plate 28. These frames and their relation to the chains and the bedplate are shown in somewhat more detail in Fig. 3.

The mixture discharged from mixer 18 onto the bedplate is so regulated in quantity as to more than fill the frames, the mounds of earth so formed being drawn beneath a roller or preferably a stiff band 32 moving at the same speed as the frames. This band is supported by driven rollers 33—33 and is pressed down against the earth by idler rolls 34. By this means the earth is pressed into suitable sized slabs for calcination, as from 4″ to 10″ square and from ½″ to 1½″ thick.

This cake forming device presents no novelty and is suggestive only, as recourse may be had to any of the various shape forming devices known in the ceramic arts. Care should be exercised, however, to avoid such pressure as might damage the fragile structure of the uncalcined diatoms.

The cakes formed in this or other devices fall into a boot 35 from which they are raised by an elevator 36 and discharged into the upper end of a shaft kiln 37. This kiln, which may be more or less of the shape shown in Figs. 1 and 4, is provided with a strong screw conveyor 38, a grate or grid 39, and an air blower 40 discharging into the lower portion of the shaft. A plurality of gas or oil burners 41—41 may also be provided for igniting the initial charge and for maintaining a desired temperature at the base of the kiln.

In operating this kiln the shaft 42 is filled substantially to the top with blocks of earth containing a sufficient quantity of the preferred fuel to effect their calcination. The burners 41 are then started and kept in operation until the lower part of the charge is heated to a temperature at which the intermixed fuel will burn freely, a slow stream of air to support this combustion being delivered by blower 40. As the kiln becomes heated throughout its height the air delivery may be gradually increased and the gas fires are withdrawn when combustion of the intermixed fuel is well under way.

As soon as the bottom portion of the charge is burned free from carbon, the screw 38 is started, withdrawing calcined earth from the bottom of the kiln and permitting the charge to subside in the shaft. The delivery of blocks to the upper end of the shaft is then resumed, at such rate as to maintain the top of the charge at a substantially constant level. At this point the operation becomes continuous, raw blocks being fed in at the top as fast as calcined material is removed from the bottom.

While the blocks must be sufficiently strong to maintain air channels through all parts of the charge in the shaft, more or less crushing of the calcined blocks in the screw conveyor is entirely immaterial as the blocks pass immediately to an operation in which they are powdered.

In calcining diatomaceous earth it is essential to burn out the last traces of the fuel in order to avoid discoloration of the mineral product, and as it is desirable to maintain the charge at some preferred maximum temperature through the greatest possible part of the length of the kiln, the air supply is so regulated as to maintain combustion to the greatest possible height, by the use of excess air or by the introduction of secondary air supplies at graduated heights as by means of the damper controlled openings 44—44.

The conditions within a shaft kiln are particularly favorable to economy of fuel. The highly heated blocks passing slowly toward the bottom of the kiln are swept by large volumes of cold entering air, to which they impart a large part of their sensible heat. The air is thus preheated to a temperature at which complete combustion of the last traces of carbon takes place. The hot gases moving upwardly from the combustion zone pass through a mass of cold blocks, vaporizing the water contained in them and giving up a large part of their sensible heat in preheating the blocks to ignition temperature. The gases and solid materials are thus subjected at each end of the shaft to heat interchanges by which the products are caused to leave the shaft at materially lowered temperatures and an important part of the heat is returned to the charge. The formation of soot from volatile fuels may be avoided by introducing secondary air into the zone of volatilization, or soot which may be allowed to form is entrained and returned by the colder blocks moving downwardly into the zone of soot formation.

Any fuel which does not yield an excessive quantity or a harmful quality of ash may be used in this operation. Thus I may use heavy petroleum distillates or nonasphaltic crude oils (asphaltic oils tend to glaze the blocks and prevent combustion throughout), noncaking bituminous coals, lignites, oil shales, diatomaceous shales containing bituminous matter, sawdust or other vegetable fibre, anthracite, cokes and still or retort carbon. All solid fuels, and particularly those consisting almost completely of carbon or having a consistent ash (like the lignites and bituminous shales) should be reduced to a very fine state of subdivision, and all fuels of whatever nature must be most intimately and uniformly distributed through the earth mass before the blocks are formed. For shaft kiln calcination the preference will usually be with a solid fuel containing a relatively low proportion of volatile combustible.

While I prefer to burn the blocks in the manner above described, I may also burn or calcine them in the manner described in my copending application entitled "Method of calcining diatomaceous earth", filed March 29, 1934 under Serial No. 718,097, this method being illustrated in Fig. 2 of the attached drawing.

Referring to Fig. 2, 50 is a conventional rotary kiln, fired at its lower or outlet end as indicated by arrow 51 and provided with a breeching 52 and stack 53. The formed blocks are delivered into the higher or inlet end of the kiln by any conveying means 54 and form a gradually advancing layer on the bottom and the rising side of the kiln, being finally discharged from the outlet end as at 55. Any suitable apparatus for producing forced draft through the kiln may be added if desired.

When calcining in this apparatus, a portion only of the total amount of fuel required for calcination is intermixed with the earth, prior to forming the blocks and in the manner above described, using any of the liquid or solid fuels. The remainder of the fuel is burned in or closely adjacent to the outlet end of the kiln, the flame produced by oil, gas or pulverized fuel burners or in a Dutch oven being injected directly into the end of the kiln.

In this manner of calcining a very even temperature gradient may be established throughout the length of the kiln and the blocks subjected to the most favorable temperature during the greatest possible portion of their travel time through any given kiln.

While the burning of a portion of the fuel in the lower end of the kiln has been described only in connection with rotary kiln operation, it will be understood that this procedure may also be followed in the manipulation of the shaft kiln by continuing the operation of burners 41, usually at a reduced rate, and if necessary introducing secondary air through the openings 44. It will also be understood that when this procedure is followed, the fuel supply is divided, a part being intermixed with the material of the blocks and the remainder burned at the lower end of the kiln, exactly as in rotary kiln operation.

Whichever method of burning is adopted, the amount of fuel intermixed with the earth must be sufficient to produce the amount of heat required in the calcination, either by itself or when taken as a part of the total fuel requirement. In the latter case the relation between intermixed fuel and injected fuel may be varied to control the temperature gradient within the kiln but, except for the possible loss of highly volatile fuels by vaporization, the total quantity will be a constant for any given set of conditions.

The ratio of total fuel to earth is, of course, highly variable, depending on the quantity of water present in the raw material, the temperature and duration of the burn and the heat efficiency of the apparatus, but I have found that in rotary kiln operation to produce a light weight product having a high flow rate, about ten per cent by weight of fuel, calculated on the dry earth and as a heavy petroleum distillate, is required in the specific kiln in which I have operated, and that from one-third to two-thirds of this quantity may advantageously be intermixed with the earth. In the shaft kiln, when operated without bottom heating as first described, the total consumption of fuel is materially lower because of the lowered temperature of the issuing solid and gaseous products.

Because of the absolute necessity of regulating the proportion of fuel to earth, it is rarely possible to calcine the bituminous diatomaceous shales found in California and elsewhere without the addition either of fuel or of other earth. In the progress of the calcination the organic matter must be entirely burned out as any residual traces of carbon destroy the valued white or pink color. If the shale originally contained an excess of combustible, the high temperature or long continued heating required to burn out the excess are equally detrimental to the lightness and porosity of the product. Such shales, even where the mineral residue is of such character as to be useful as a constituent of the final product, should therefore be considered only as low grade fuels for intermixture with other earth or other fuel as the case may be, except in those rare cases where the original fuel content is such as to yield a satisfactory final product without any intermixture of fuel or earth.

The product of the above described operation is a more or less shattered block which may be disintegrated to a powder of extreme lightness, very high flow rate, high oil absorption and low acid solubility, all of these being most desirable characteristics. More specifically, the density is reduced about 20%, the flow rate is increased at least one-half, and the oil absorption is increased about 30% when the acid solubility is maintained constant or is at least slightly improved when the acid solubility is decreased in about the same proportion. All of these comparisons are against the quality of the best products obtainable from the same raw feed (earth only or earth and flux as the case may be) when calcined without the intermixture of fuel.

To the best of my knowledge these improvements cannot be produced by any known method of calcination other than that of my copending application Serial No. 718,097. The method described in the North patent does not include the addition of fuel to the earth from which the blocks are formed and does not produce any improvement in results over those of other methods heretofore known and used nor any results at all comparable with the results yielded by either modification of the instant application or by the method of the copending application.

In the course of the foregoing, reference has repeatedly been made to calcination, flow rate, wet density, oil absorption, and acid solubility and as these are all trade terms having a specific meaning in the manufacture and testing of diatomaceous earth, it may be well to define them.

Calcination consists in heating the powdered earth to a temperature at which the combined water is driven off, the gelatinous silica and/or calcium silicate which usually occurs in the raw earth is converted into a hard but porous solid gel (e. g., silica gel), the organic matter (if any) is burned out, any soluble salts are converted into silicates, and the structure of the diatoms proper is hardened and toughened. The result of these changes is the development of properties highly desirable when the earth is to be used as a filter aid.

Calcination in the limited meaning above ascribed to the term rarely or never takes place below 1500° F., as the combined water is not driven off below that temperature. Above 1700° F. a pronounced shrinkage of the earth takes place, due to a partial sintering of the diatom structure in the presence of relatively small quantities of clays and other silicates. This shrinkage may amount to a reduction in volume of 15% or more, and results in a greater density and reduced porosity and flow rate.

The method of the instant application, which permits calcination to be conducted at a commercially economical rate while maintaining a temperature not materially above 1700° F. at any time or in any part of the charge makes possible the production of a calcined earth having the most desirable properties fully developed, while avoiding the disadvantages attendant on shrinkage, these results being producible, in methods heretofore used, only by an extremely tedious heat treatment in a single operation or by an equally tedious and costly double calcination with a comminuting operation interposed between the two burning steps.

Flow rate is a measure of the ability of an earth to remove very fine or colloidal suspensoids from liquids and to produce a high degree of clarity in the filtrate. In tests to determine the flow rate of a given earth a dose of the earth sufficient to produce a standard degree of clarity is suspended in a standardized sugar solution, the clarification of such solutions affording the principal market for filter aids. The suspension is placed in a filter and the amount of clarified filtrate delivered in a fixed period of time under an arbitrarily fixed pressure is the direct measure of the flow rate, which is converted into a relative measure by comparing the test yield with the yield from a standard sample of the same grade of finished earth. As a large yield of filtrate of the required clarity is probably the most desired characteristic of a filter aid, the larger the relative figure obtained in the above test the greater the value of the material.

The specific density or wet density is the actual weight in pounds per cubic foot of the compacted earth, as determined by centrifuging a weighed quantity of the earth from a relatively dilute suspension and measuring the volume of the compacted layer. A low wet density is an indication of high flow rate and absorption factor, and is desirable per se in all cases where the relation between weight and volume is a factor in the usefulness of the material, as, for example, in insulating compounds.

The oil absorption test is a direct measure of porosity, and a high oil absorption is valuable in all cases when solid bodies (e. g. battery boxes) are produced by saturating the earth with a semifluid such as asphalt.

The acid solubility figure represents the percentage weight of the earth dissolved in 65 parts by weight of sulfuric acid of 1.3 specific gravity in one hour at 205° F. A low acid solubility is desirable in an earth used for the manufacture of battery boxes or the lining of acid tanks, and in a filter aid used for the clarification of acid liquors.

While the results produced by the process herein claimed and by the process of the copending application are strictly comparable, the instant process has in some cases an advantage over the treatment in powdered form.

One advantage, which under some circumstances may be quite material, is that the calcination may be conducted in a shaft kiln, an obvious impossibility where handling powdered material. On a basis of unit throughput the shaft kiln is much cheaper than the rotary kiln, both to build and to operate, and when fired in the manner first described there is also an important saving of fuel.

Another advantage, which also attaches to the calcination of blocks in a rotary kiln, is that it offers an additional control over the rate of combustion of the intermixed fuel and therefore over the temperature gradient. Diatomaceous earth is so light and so porous that the particles of fuel dispersed through its highly mobile powder are contacted with the air stream much more readily than is the case with heavier and denser powders, and as the hard and slowly combustible fuels may not always be available, there is sometimes difficulty in sufficiently retarding the burning out of the fuel to obtain the best temperature gradient. By burying this fuel in a cake which has a high heat insulating value but is readily permeable to air, the rate of combustion may be retarded and controlled by varying the ratio of surface to mass and also by varying the degree to which the cake is compressed and consolidated.

I claim as my invention:

1. The method of calcining diatomaceous earth which comprises: comminuting said earth; intermixing combustible matter with said earth; forming said mixture into coherent solid bodies; subjecting said bodies to a calcining temperature and simultaneously consuming said combustible matter.

2. The method of calcining diatomaceous earth which comprises: comminuting said earth; intermixing with said earth the quantity of fuel required for calcination of said earth; forming said mixture into coherent solid bodies; producing combustion of said fuel and thereby raising said bodies to calcining temperature, and supplying sufficient air to said bodies to consume the combustible constituents of said fuel.

3. The method of calcining diatomaceous earth which comprises: comminuting said earth; intermixing with said earth the quantity of fuel required for calcination of said earth; forming said mixture into coherent solid bodies; collecting and retaining said bodies within a vertical enclosure; producing combustion of said fuel and thereby raising said bodies to calcining temperature; supplying air to the lower portion of said enclosure to produce said combustion and to thereafter cool said bodies; withdrawing calcined earth from the lower portion of said enclosure, and replacing said withdrawn earth by supplying further quantities of said bodies to the upper portion of said enclosure.

4. The method of calcining diatomaceous earth which comprises: comminuting said earth; intermixing with said earth a portion of the total quantity of fuel required for the calcination of said earth; forming said mixture into coherent solid bodies; continuously passing a stream of said bodies through a heating and combustion zone, and continuously passing through said zone in counterflow to said stream the fire gases produced by burning the remainder of said total quantity of fuel, together with air in quantity sufficient to consume the combustible portion of said intermixed fuel.

McKINLEY STOCKTON.